United States Patent [19]

Hirano et al.

[11] Patent Number: 5,729,072
[45] Date of Patent: Mar. 17, 1998

[54] STATOR FOR AN ELECTRIC MOTOR

[75] Inventors: Mikio Hirano, Tondabayashi; Seiji Kikuchi, Nishinomiya; Manabu Takeuchi, Daito; Hiroshi Kawazoe; Kouzi Fukuda, both of Hirakata; Takashi Akiyama, Osaka; Koichi Nakatsukasa, Sanda; Hideki Yamanaka, Kadoma; Kazunori Morita, Ikoma, all of Japan

[73] Assignee: Matsushita Electric Industrial Co., Ltd., Osaka, Japan

[21] Appl. No.: 123,383

[22] Filed: Sep. 20, 1993

[30] Foreign Application Priority Data

Sep. 24, 1992 [JP] Japan .................. 4-254321

[51] Int. Cl.$^6$ .................................................. H02K 1/16
[52] U.S. Cl. .................. 310/258; 310/179; 310/254; 310/42; 310/217
[58] Field of Search ............................ 310/217, 254, 310/258, 179, 216, 218, 42

[56] References Cited

U.S. PATENT DOCUMENTS

| | | | |
|---|---|---|---|
| 1,756,672 | 4/1930 | Barr | 310/217 |
| 1,779,950 | 10/1930 | Reichel | 310/254 |
| 1,901,315 | 3/1933 | McCarty | 310/254 |
| 2,688,103 | 8/1954 | Sheldon | 310/254 |
| 2,774,000 | 12/1956 | Ross | 310/216 |
| 3,056,896 | 10/1962 | Ludemann | 310/216 |
| 3,260,875 | 7/1966 | Evans | 310/217 |
| 4,217,510 | 8/1980 | Detinko | 310/258 |
| 5,256,926 | 10/1993 | Hagenlocher | 310/259 |
| 5,583,387 | 12/1996 | Takeuchi et al. | 310/217 |

*Primary Examiner*—Steven L. Stephan
*Assistant Examiner*—Judson H. Jones
*Attorney, Agent, or Firm*—Watson Cole Stevens Davis, P.L.L.C.

[57] ABSTRACT

In a stator for an electric motor, insulating members are formed on laminated iron cores divided for each pole-tooth unit in the direction of the output shaft and windings are applied perpendicularly to the pole-tooth portions in a high-density alignment. After a predetermined number of the laminated iron cores are combined so as to form a cylindrical configuration, they are welded at the outer end portions of the dividing surfaces in the direction of lamination so as to construct an integral structure stator with rigidity, thereby enabling high densification of the windings (conductor space factor of 70%) and space-savings in the winding end portions. Further, as any joint portions between the pole-tooth portions are not necessary, reduction (5 to 10%) in motor efficiency due to such joint portions can be prevented, and, as any integrally forming by resinous members is not necessary, inter-winding short-circuiting is not caused. Welding may be replaced by adhesive bonding. Otherwise, an annular member may be employed to form an integral structure of the divided iron core lamination.

7 Claims, 3 Drawing Sheets

STATOR FOR AN ELECTRIC MOTOR

BACKGROUND OF THE INVENTION

1. Field of the Invention

The field to which the present invention relates is generally a stator for an electric motor.

In recent years, for the purposes of rendering an electric motor compact and highly efficient, a need of rendering stator windings highly densified and saving space for winding end portions has been increasingly arising. In particular, in a servo-motor used in industrial robots and others, in order to meet the recent demand for achieving a high-speed robotic operation, saving space and obtaining an increased output, it has become necessary that a magnet of an extremely high magnetic flux density be employed for a rotor, that the winding density of the stator reach a conductor space factor of 70% which represents the theoretical limit value of aligning windings, and that space for the winding end portions be made to minimum. While there has hitherto been an inserter winding as a winding technique for attaining high densification, it entails the problem of causing the space for the winding end portions to be extremely large. Accordingly, it is the recent trend to seek to enable simultaneously the windings of an increased density and the space-saving for the winding end portions to be achieved by dividing the iron core and effecting the windings in alignment at an outside place.

2. Description of the Prior Art

The constructions of conventional stators will now be described below.

FIG. 4 shows the construction of a stator aimed to highly densify its windings and to save the space for the winding end portions. In FIG. 4, numeral 1 designates a first iron core member constituting the outer part of an iron core whereas numeral 2 designates a second iron core member constituting the inner part of the iron core. Numeral 3 designates a joint portion connecting adjacent pole-tooth portions of the second iron core member. Numeral 4 designates an insulator, numeral 5 designates windings and numeral 6 denotes a resinous part.

In the above construction, the windings 5 are wound perpendicularly around the insulator 4 in a high density in alignment at an outside place, and a predetermined number of such windings 5 are inserted on the pole-tooth portions of the second iron core member 2. Thereafter, the second iron core member 2 is inserted into the first iron core member 1 to constitute the stator iron core. In addition, the resinous part is formed by molding or the like to complete the integral structure of the stator.

Next, FIGS. 5A and 5B show the construction of another conventional and typical stator in which a laminated iron core is divided in the direction of its output shaft. In FIG. 5A, numeral 7 designates a laminated iron core which is divided into two by a dividing surface 8. Numeral 9 designates windings. In FIG. 5B, numeral 10 designates a resinous part.

In the above construction, the windings 9 are perpendicularly wound around the outer periphery of the laminated iron core 7 divided into the two parts. Thereafter, the laminated iron core 7 is matched at the dividing surfaces 8 and is made integral with the resinous part 10.

The foregoing first conventional constructions, however, involves the following problems:

(1) Due to the fact that the iron core constituting the stator is divided at the outer circumferential surfaces of the pole-tooth portions, the joint portions 3 connecting the pole-tooth portions at their inner parts are indispensable in order to structure and maintain the second iron core member 2.

(2) In the joint portions 3 indispensable as abovesaid, magnetic leakage occurs between the pole-teeth, causing a problem that the motor efficiency drops by 5 to 10%, and this requires the joint portions 3 to be formed as thinly as possible.

(3) Therefore a need arises so as to form the resinous part 6 in order for the rigidity of the stator structure to be properly given; however, a problem arrises that an inter-winding short-circuiting tends to be caused as a result of a damage of the insulating sheathes of the windings 5 at the time of forming such resinous part 6.

(4) Besides, the inconvenience arises that, following the necessity of a larger iron core, a larger press equipment and molding apparatus become necessary, and productive efficiency is reduced.

Furthermore, in the foregoing second conventional construction, the perpendicular winding of the windings 9 around the outer periphery of the laminated iron core 7 renders the windings not in alignment and does impose the limitation of conductor space factor at 52 to 55%. Moreover, while space-saving for the winding end portion is possible, the dimension increases as the windings extend over in the direction of the outer diameter.

SUMMARY OF THE INVENTION

The present invention has for its object to solve the foregoing conventional problems and provides a stator for an electric motor which, while maintaining the construction which enables high-density aligning winding to be carried out at an outside place, is designed to effect space-saving for the winding end portions, eliminates such joint portions between the pole-teeth which tend to reduce the motor efficiency, also eliminates forming of such resinous part hitherto required to ensure the stator rigidity, and yet has a divided construction which enables a large-sized iron core to be produced with a small-sized press equipment.

In order to achieve this object, a stator for an electric motor according to the present invention comprises laminated iron cores divided for each pole-tooth unit and windings wound perpendicularly to the pole-tooth portions of the laminated iron cores, wherein a predetermined number of the laminated iron cores are combined so as to form a cylindrical form and thereafter the laminated iron cores are made integral by welding, bonding or applying an annular member.

By virtue of this construction, (1) As the iron cores are divided for pole-tooth unit, it becomes possible to wind up the windings perpendicularly around the pole-tooth portion in a high density in alignment (a conductor space factor of 70%) at an outside place for an individual set of the laminated cores, and space-saving in the winding end portions is performed.

(2) As it is possible to obtain the necessary rigidity of the stator by welding, bonding or applying an annular member after a predetermined number of the iron core are combined so as to form a cylindrical form, such resinous part becomes unnecessary and such inter-winding short-circuiting is prevented from occurring. Further, since such joint portions for the pole-teeth portions to construct and maintain the integral iron core are made unnecessary, it is possible to prevent a reduction in motor efficiency by 5 to 10% due to such joint portions.

(3) As the laminated iron core is divided for pole-tooth unit, even a large-sized iron core can be produced with a small-sized press equipment, and production efficiency is markedly enhanced.

DETAILED DESCRIPTION OF THE INVENTION

Hereinafter, several embodiments of the present invention will now be described with reference to the accompanying drawings.

EMBODIMENT 1

Figure 1:
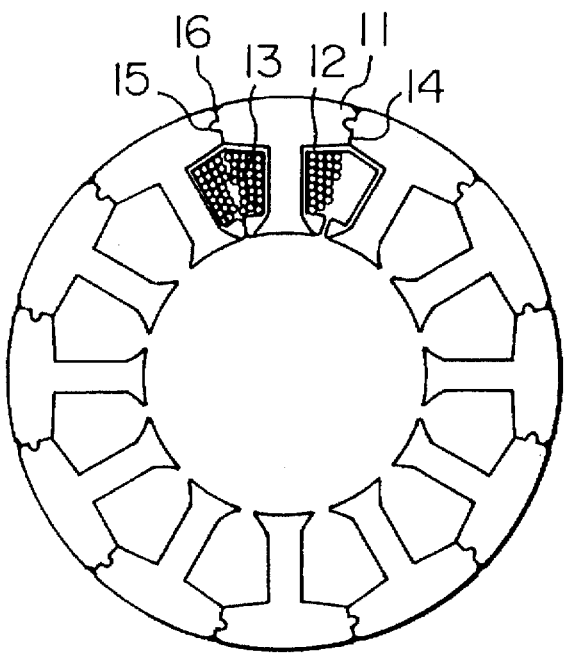
FIG. 1 is a top plan view partly in cross-section illustrating a stator in a first embodiment of the present invention.

In FIG. 1, numeral 11 designates laminated iron cores divided for each pole-tooth unit, numeral 12 designates insulating members formed on the pole-tooth portions of the laminated iron cores 11, numeral 13 designates windings, numeral 14 designates dividing surfaces of the divided iron cores, and numeral 15 designates projections, and numeral 16 designates welded portions.

In the stator for an electric motor constructed as above, the laminated iron cores 11 are, after being laminated for each pole-tooth unit by means of a small-sized press equipment, given the insulating members 12 on the pole-tooth portion, and the windings 13 are formed in a high density in alignment by means of an appropriate winding machine at the outside place. Thereafter, a predetermined number of the laminated iron cores 11 are combined with the projections 15 on the dividing surfaces 14 so as to form a cylindrical configuration, and then the outer end portions of the dividing surfaces are laser-welded in the direction of lamination to form the welded portions 16, thereby constituting an integral structure with necessary stator rigidity.

Figure 4:
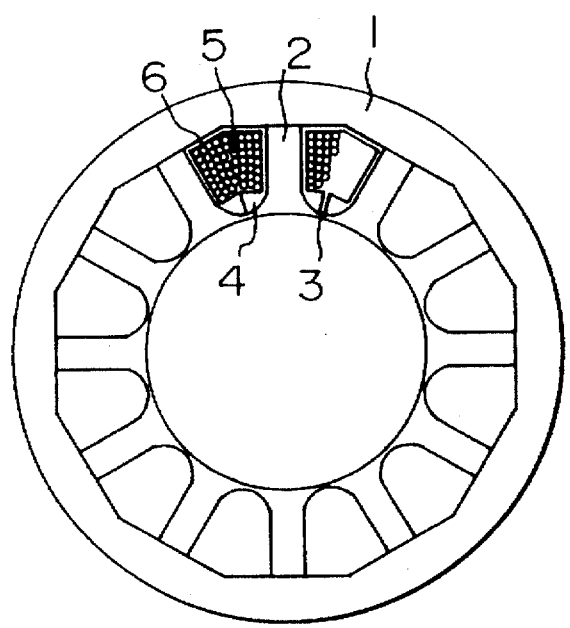
FIG. 4 is a top plan view partly in cross-section illustrating a conventional stator of the prior art.
Figure 5A:
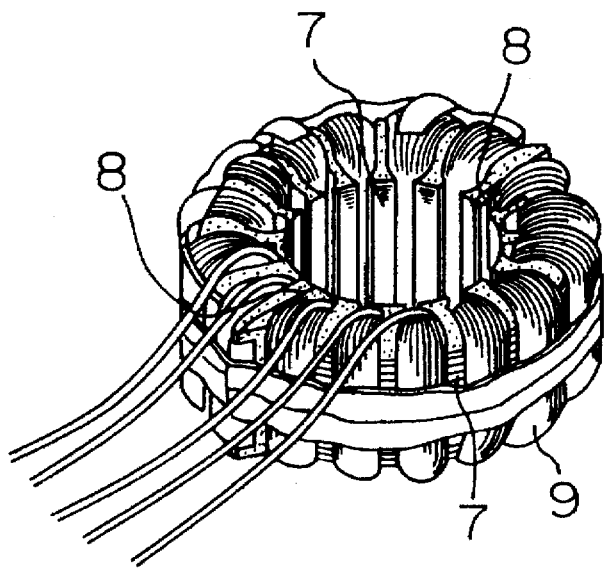
FIG. 5A is a perspective view illustrating another conventional stator of the prior art before resinous part is applied.
Figure 5B:
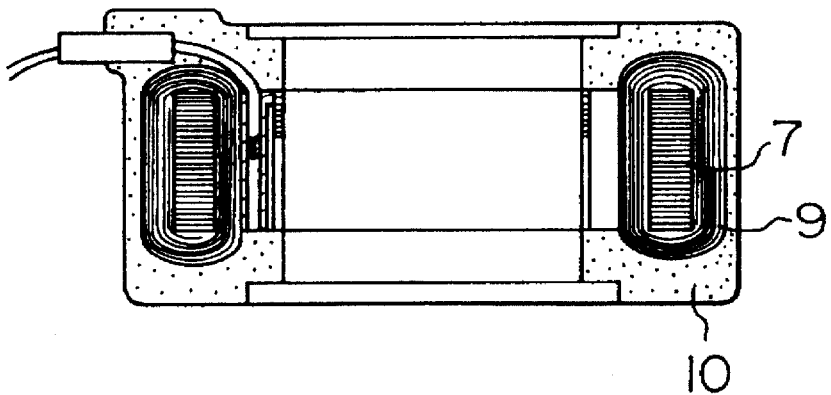
FIG. 5B is a side cross-sectional view illustrating the conventional stator of FIG. 5A.

According to this embodiment, by forming the laminated iron cores 11 in dividing for pole-tooth unit and providing the windings 13 in high-density alignment for each pole-tooth unit, a conductor space factor of 70% can be obtained. Further, by forming the welded portions 16 at the outer end portions of the dividing surfaces 14 of the laminated iron cores 11 to construct an integral structure, such joint portions 3 in the prior art illustrated in FIG. 4 are made unnecessary, and it becomes possible to prevent such drops by 5 to 10% in motor efficiency. Further, such resinous part 6 is also made unnecessary, and a stabilized stator assembly without inter-windings' short-circuiting are obtained. Furthermore, by the laminated iron cores being finely divided, a small-sized press equipment can be utilized, thus remarkably enhancing the production efficiency.

EMBODIMENT 2

Figure 2:
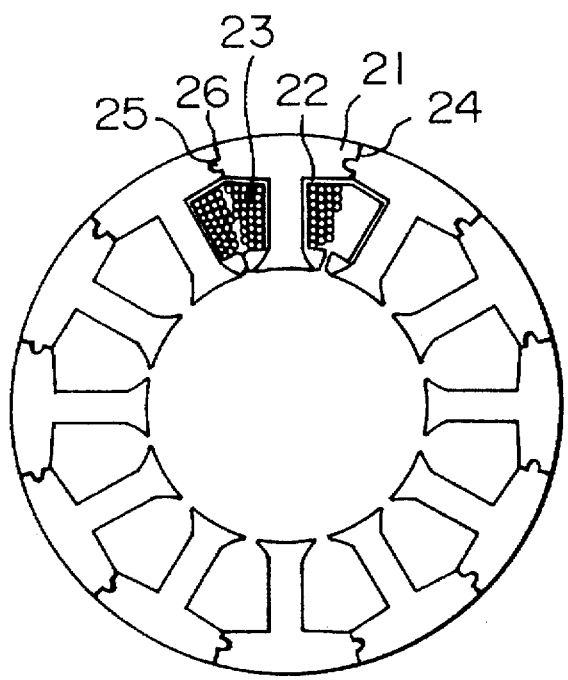
FIG. 2 is a top plan view partly in cross-section illustrating a stator in a second embodiment of the present invention.

In FIG. 2, numeral 21 designates laminated iron cores divided for each pole-tooth unit, numeral 22 designates insulating members formed on the pole-tooth portions of the laminated iron cores 21, numeral 23 designates windings, numeral 24 designates dividing surfaces of the iron cores and numeral 25 designates projections. These are like those of the construction illustrated in FIG. 1. Unlike the construction of FIG. 1, however, here, bonding layers 26 are provided in lieu of the welded portions 16.

In the stator for an electric motor being constructed as above, the laminated iron cores 21 are, after being laminated for each pole-tooth unit by means of a small-sized press equipment, given the insulating members 22 on the pole-tooth portions, and the windings 23 are formed in a high-density in alignment by means of an appropriate winding machine at an outside place. Thereafter, the laminated iron cores 21 are combined in a predetermined number with the projections 25 on the dividing surfaces 24 so as to form a cylindrical configuration, and, by an extremely thin bonding layer 26 having been applied at each dividing surface 24 beforehand, an integral structure with necessary rigidity as a stator is obtained.

According to this embodiment, by forming the laminated iron cores 21 being divided for each pole-tooth unit and providing the windings 23 in high-density alignment for each pole-tooth unit, a conductor space factor of 70% can be obtained. Further, by forming the bonding layers 26 on the dividing surfaces 24 of the laminated iron cores 21 so as to construct an integral structure, such joint portions 3 in the prior art illustrated in FIG. 4 are made unnecessary, and it becomes possible to prevent such drops of 5 to 10% in motor efficiency. Further, such resinous part 6 becomes unnecessary, and a stabilized stator without such interwinding short-circuiting is obtained. Furthermore, by the laminated iron cores being finely divided, a small-sized press equipment can be utilized, thus remarkably enhancing the production efficiency.

EMBODIMENT 3

Figure 3:
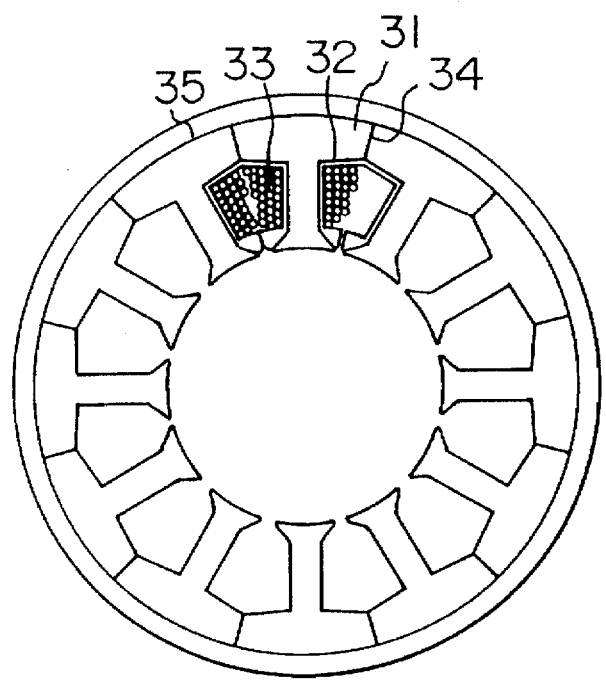
FIG. 3 is a top plan view partly in cross-section illustrating a stator in a third embodiment of the present invention.

In FIG. 3, numeral 31 designates laminated iron cores divided for each pole-tooth unit, numeral 32 designates insulating members formed on the pole-tooth portions of the laminated iron cores 31, numeral 33 designates windings, and numeral 34 designates dividing surfaces of the laminated iron cores. These are like those of the construction illustrated in FIG. 1. Unlike the construction of FIG. 1, however, here, an annular member 35 is provided in lieu of the welded portions 16.

In the stator for an electric motor constructed as above, the laminated iron cores 31 are, after being laminated for each pole-tooth unit by means of a small-sized press equipment, given the insulating members 32 on the pole-tooth portions, and the windings 33 are formed in a high-density in alignment by means of an appropriate winding machine at an outside place. Thereafter, the laminated iron cores 31 are combined in a predetermined number with the dividing surfaces 34 so as to form a cylindrical configuration, and then, they are inserted in the annular member 35 with an appropriate interference, being urged in the direction to the inner diameter; thus an integral structure with necessary rigidity as a stator is obtained.

According to this embodiment, by forming the laminated iron cores 31 being divided for each pole-tooth unit and providing the windings 33 in high-density alignment for pole-tooth unit, a conductor space factor of 70% can be obtained. Further, by providing the annular member 35 on the outer periphery of the laminated iron cores 31 and pressing the latter in the direction to the inner diameter to obtain an integral structure, such joint portions 3 in the prior art illustrated in FIG. 4 are made unnecessary, and it becomes possible to prevent such drops of 5 to 10% in motor efficiency. Further, such resinous part 6 becomes unnecessary, and a stabilized stator without inter-winding short-circuiting is obtained. Furthermore, by the laminated iron cores being finely divided, a small-sized press equipment can be utilized, thus remarkably enhancing the production efficiency.

At this point, it will readily be understood that in the first embodiment, the necessary rigidity of the stator structure is obtained by the welded portions 16 themselves; however, the bonding layers 26 in the second embodiment and/or the annular member 35 in the third embodiment may be jointly used in combination to obtain a stator structure of more increased rigidity.

As described in the foregoing, the present invention provides a stator assembly for a rotary electric motor which comprises laminated iron cores divided for each pole-tooth unit and windings wound perpendicular to the pole-tooth portions of the laminated iron cores, wherein, after a predetermined number of the laminated iron cores are held so as to build up a cylindrical form, such iron cores are made integral by welding, bonding, or applying an annular member, thereby obtaining a superior stator assembly not available heretofore, which enables high densification of the windings (with a conductor space factor of 70%), and elimination of the joint portions hitherto required between adjacent pole-teeth, and achieves space-saving and a large enhancement of motor efficiency, and besides highly improves the production stability and efficiency markedly by virtue of fine division of the laminated iron cores.

We claim:

1. A stator for an electric motor, said stator comprising:
   a plurality of cores, each of the plurality of cores corresponding to a pole-tooth unit of the electric motor and comprising a pole-tooth portion and an outer portion with an outer surface and dividing surfaces, said dividing surfaces extending parallel to a longitudinal axis of said electric motor, said plurality of cores being arranged in a cylindrical configuration, and adjacent ones of said plurality of cores being rigidly fixed together along said dividing surfaces; and
   windings wound around the pole-tooth portions of the plurality of cores such that each of the windings is wound around a single one of the pole-tooth portions;
   wherein the plurality of cores are bonded at the dividing surfaces.

2. A stator for an electric motor, said stator comprising:
   a plurality of cores, each of the plurality of cores corresponding to a pole-tooth unit of the electric motor and comprising a pole-tooth portion and an outer portion with an outer surface and dividing surfaces, said dividing surfaces extending parallel to a longitudinal axis of said electric motor, said plurality of cores being arranged in a cylindrical configuration, and adjacent ones of said plurality of cores being rigidly fixed together along said dividing surfaces; and
   windings wound around the pole-tooth portions of the plurality of cores such that each of the windings is wound around a single one of the pole-tooth portions;
   wherein the plurality of cores are welded together along the dividing surfaces.

3. A stator for an electric motor, said stator comprising:
   a plurality of cores, each of the plurality of cores corresponding to a pole-tooth unit of the electric motor and comprising a pole-tooth portion and an outer portion with an outer surface and dividing surfaces, said dividing surfaces extending parallel to a longitudinal axis of said electric motor, said plurality of cores being arranged in a cylindrical configuration, and adjacent ones of said plurality of cores being rigidly fixed together along said dividing surfaces; and
   windings wound around the pole-tooth portions of the plurality of cores such that each of the windings is wound around a single one of the pole-tooth portions;
   wherein each of the plurality of cores comprises a projection and an indentation at said outer portion, said adjacent ones of said plurality of cores being engaged by means of said projection and said indentation.

4. A stator according to claim 1, further comprising an annular member arranged on the outer surface of each of the plurality of cores to hold the plurality of cores in the cylindrical configuration and to urge the plurality of cores inwardly.

5. A stator according to claim 2, further comprising an annular member arranged on the outer surface of each of the plurality of cores to hold the plurality of cores in the cylindrical configuration and to urge the plurality of cores inwardly.

6. A stator according to claim 3, further comprising an annular member arranged on the outer surface of each of the plurality of cores to hold the plurality of cores in the cylindrical configuration and to urge the plurality of cores inwardly.

7. A stator according to claim 2, further comprising an annular member arranged on the outer surface of each of the plurality of cores to hold the plurality of cores in the cylindrical configuration and to urge the plurality of cores inwardly, and wherein each of the plurality of cores comprises a projection and an indentation at said outer portion, said adjacent ones of said plurality of cores being engaged by means of said projection and said indentation.

* * * * *